United States Patent [19]

Lepage

[11] Patent Number: 4,596,346

[45] Date of Patent: Jun. 24, 1986

[54] BICYCLE LUGGAGE RACK

[76] Inventor: Daniel Lepage, 153 Ruisseau Rouge, Magog, Quebec, Canada, J1X 3C2

[21] Appl. No.: 695,379

[22] Filed: Jan. 28, 1985

[51] Int. Cl.$^4$ .............................................. B62J 9/00
[52] U.S. Cl. .................................. 224/39; 224/30 R
[58] Field of Search ............... 224/30 R, 32 R, 32 A, 224/33 R, 39, 40

[56] References Cited

U.S. PATENT DOCUMENTS

| 671,295 | 4/1901 | Peterson | 224/39 R |
| 3,779,435 | 12/1973 | Niemann | 224/37 |

Primary Examiner—Stephen Marcus
Assistant Examiner—David Voorhees

[57] ABSTRACT

A luggage supporting rack which comprises a frame defining a support surface for supporting luggage and having one end pivotally connected to the top portion of the bicycle forks and the other outer end attached to flexible tie members which are in turn attached to an upper part of the cycle and to the lower part of the forks. The flexible ties and the pivotable connection form a suspension system for the load. Turnbuckles adjust the tension of the tie members.

8 Claims, 11 Drawing Figures

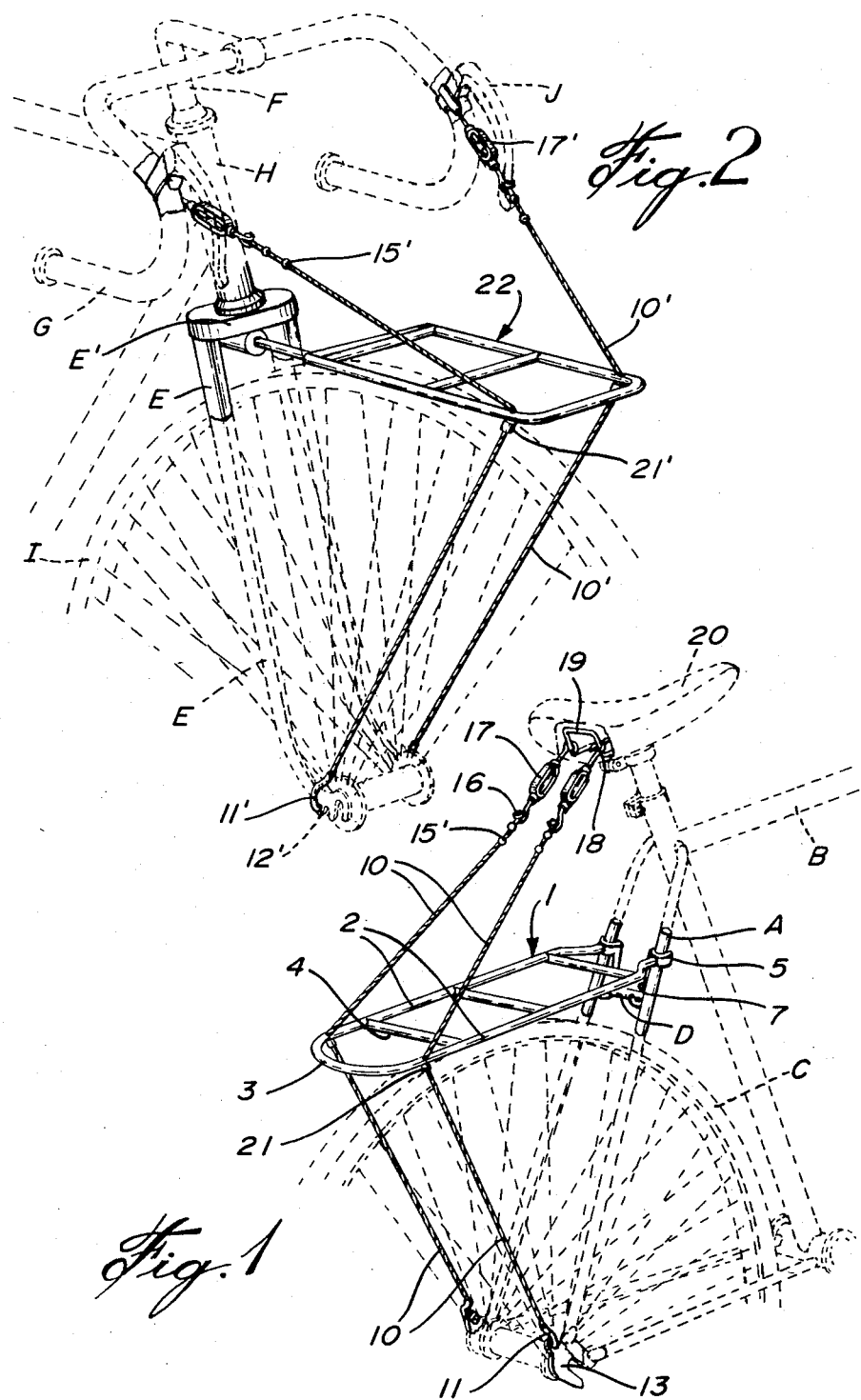

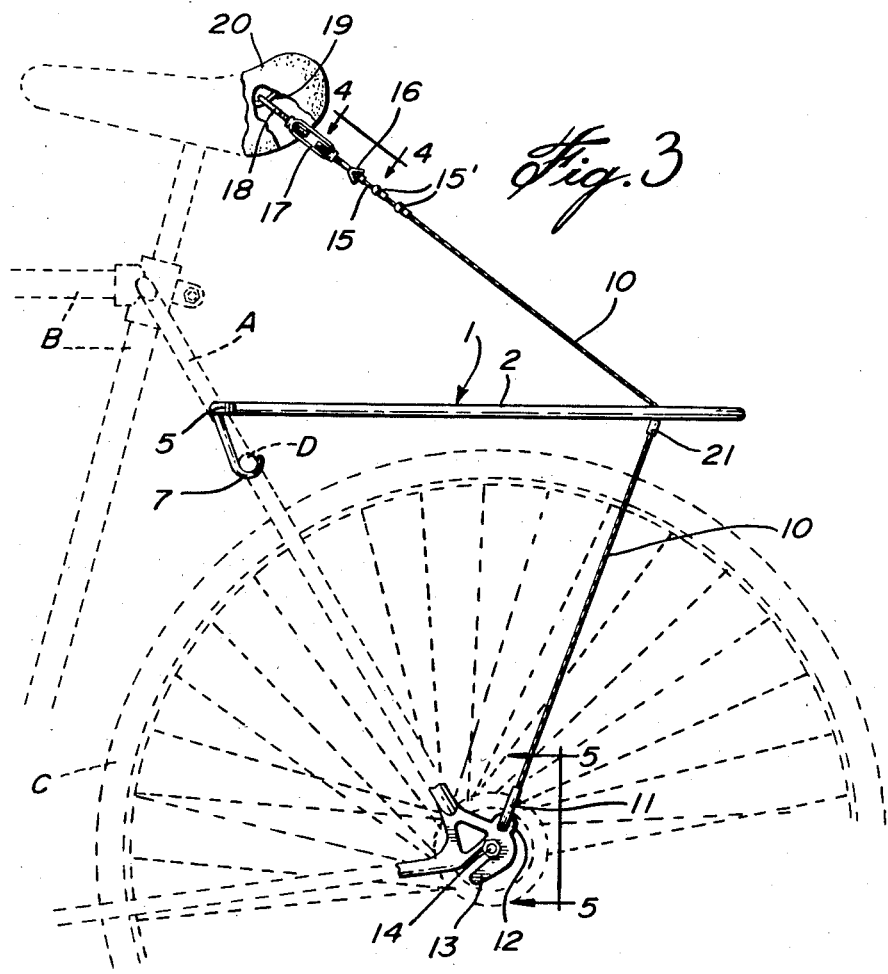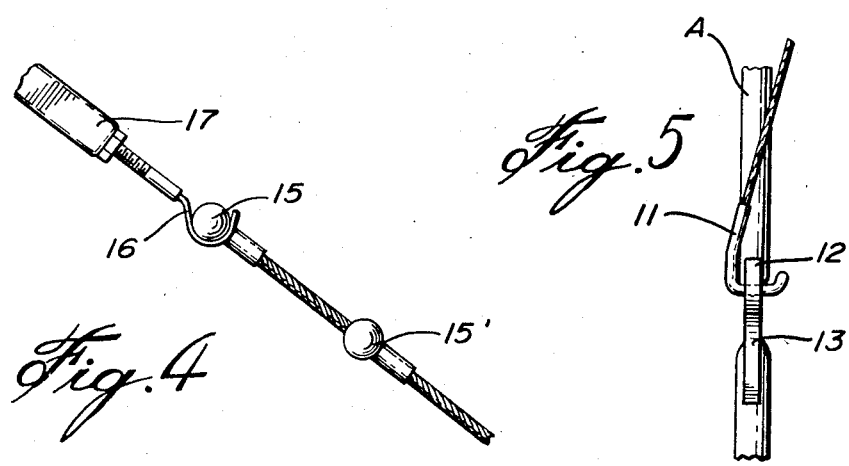

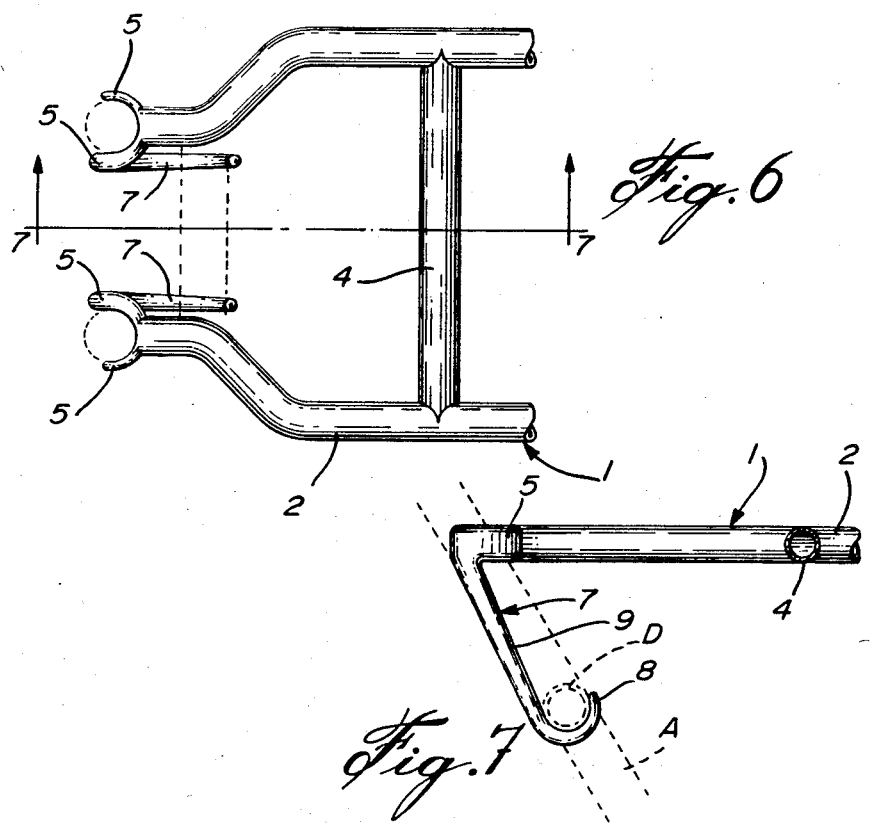
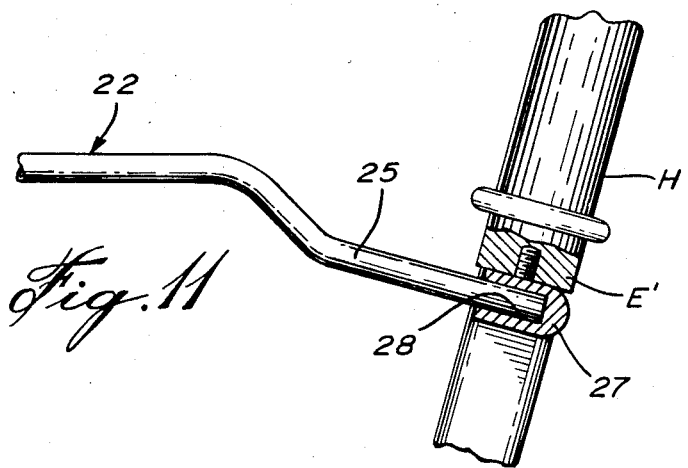

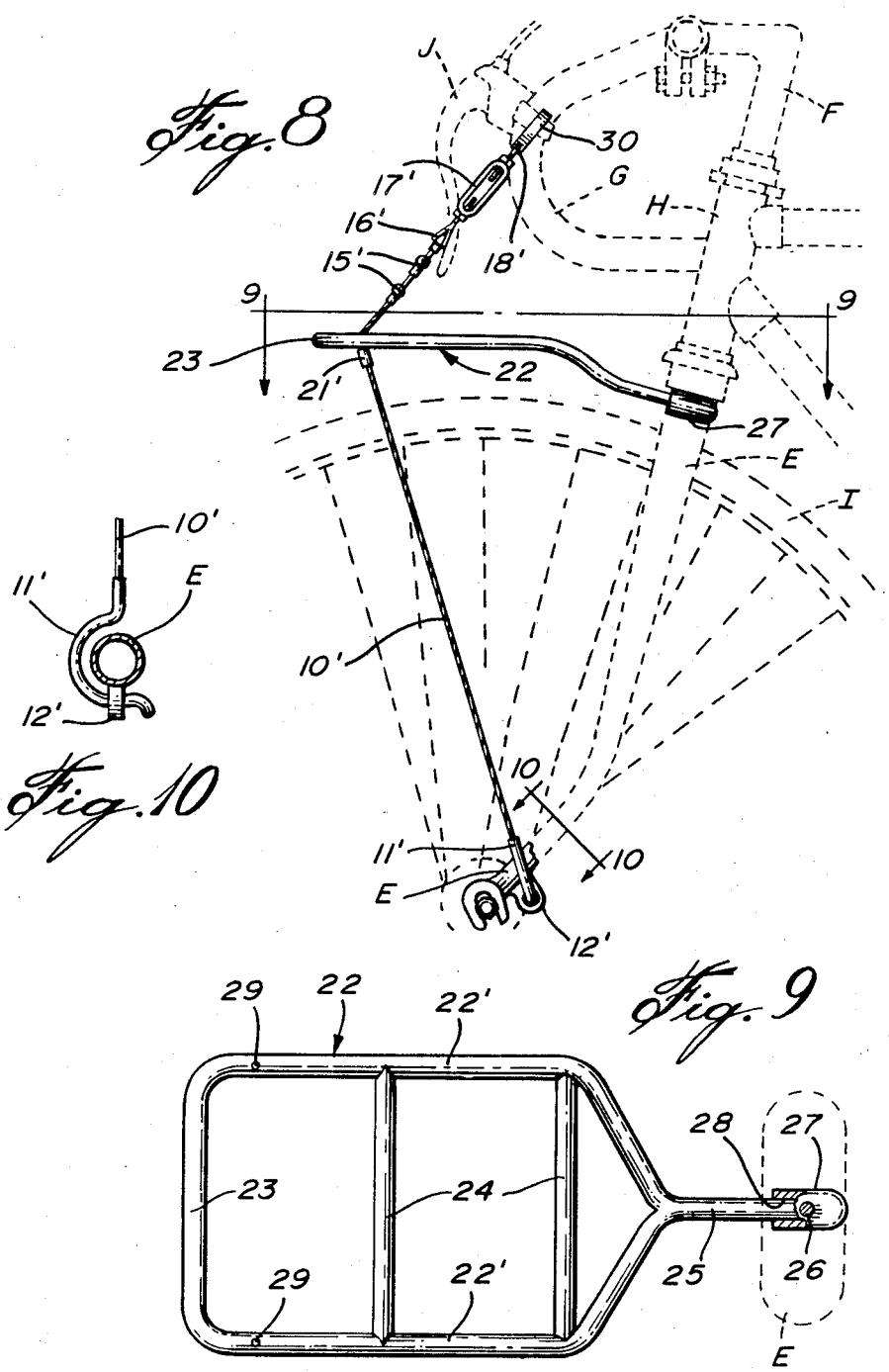

BICYCLE LUGGAGE RACK

FIELD OF THE INVENTION

This invention relates to luggage racks for bicycles and the like cycles.

BACKGROUND OF THE INVENTION

The prior art discloses various types of luggage racks for bicycles, but these racks are rigidly fixed to the bicycle and they, therefore, transmit vibrations to the cyclist when the bicycle runs on a rough surface. A typical example of prior art is U.S. Pat. No. 3,779,435 dated Dec. 18, 1973—inventor: Heinz Nyman. In this patent, the rack is supported over the bicycle wheels by rigid rods underlying the outer end of the rack and fixed to the lower ends of the bicycle fork assembly.

Also, the prior art luggage racks take time to fix to and remove from the bicycle and they take up quite a large storage space.

OBJECTS OF THE INVENTION

It is therefore the main object of the present invention to provide a luggage rack for cycles, the supporting means of which act as a suspension system for the rack and the luggage carried by the same.

Another object of the present invention is to provide a luggage rack which is inexpensive and simple in construction, which is capable of supporting a relatively heavy load; which can be mounted on and removed from a cycle in a minimum of time; and which takes up a small storage space.

SUMMARY OF THE INVENTION

The cycle load-supporting rack of the invention includes a planar frame adapted to support a load and which is of elongated shape, having means at one end for pivotal connection to the cycle frame and including flexible tie means at the other end extending upwardly and downwardly from the frame and removably attached to the lower end portion of the cycle forks and to an upper portion of the cycle, and means for tensioning said tie means. A first embodiment of the rack is designed to be supported over the rear wheel of the cycle, while the second embodiment of the rack is designed to be supported over the front wheel of the cycle. The rack can fit various makes and sizes of cycles.

BRIEF DESCRIPTION OF THE DRAWINGS

FIGS. 1 and 2 are perspective side views of the first and second embodiments of the invention, showing the same in mounted position over the rear and front wheel, respectively of the bicycle, shown in phantom lines;

FIG. 3 is a side elevation of the rack mounted as in FIG. 1 and in accordance with the first embodiment;

FIG. 4 is a partial view, taken along line 4—4 of FIG. 3;

FIG. 5 is a partial view, taken along line 5—5 of FIG. 3;

FIG. 6 is a top plan view of the inner end portion of the rack in accordance with the first embodiment;

FIG. 7 is a section taken along line 7—7 of FIG. 6;

FIG. 8 is a side elevation of the front rack mounted as in FIG. 2 and in accordance with the second embodiment of the invention;

FIG. 9 is a partly sectioned plan view taken along line 9—9 of FIG. 8;

FIG. 10 is a section taken along line 10—10 of FIG. 8; and

FIG. 11, shown on the third sheet of the drawings, is a partial section of the cycle front fork and showing the pivotal connection of the front rack.

In the drawings, like reference characters indicate like elements throughout.

DETAILED DESCRIPTION OF THE DRAWINGS

The luggage rack 1 in accordance with the first embodiment of the invention is designed to be mounted over the rear wheel of a bicycle, or the like cycle, and is shown in FIGS. 1 and 3 to 7 inclusive. Rack 1 includes an elongated rigid frame, preferably consisting of a tubular member bent into a U-shape, which defines longitudinal sides 2 joined at the outer end of the rack by curved bight portion 3 and at spaced intervals along the sides 2 by transverse braces 4. The rack is preferably made of tubular material, with the braces 4 welded, or otherwise rigidly secured to the sides 2. From the inner end of each side 2, outwardly extend a pair of curved tines 5, which form a semi-circular outwardly-opening notch. From each inner tine 5 downwarly extends a hook member 7, with the outer end 8 of the hook curved towards the rack 1 and extending inwardly from the stems 9 of the hook members 7. The inner end of rack 1 is arranged to be pivotally attached to the rear forks A of a bicycle frame B at a level above the rear wheel C of the bicycle. The rear fork A extends on each side of the rear wheel C and is normally provided with a transverse brace D just above the rear wheel C. Rear forks A and brace D are generally made of tubular material. With the rack 1 downwardly rearwardly inclined from its final horizontal position, the hook members 7 are made to engage the brace D and then the rack 1 is upwardly pivoted until rear forks A engage the respective notches formed by tines 5. In this position, the rack is generally horizontal. However, it is free to pivot downwardly in a vertical plane about transverse brace D. A pair of flexible ties, and more specifically steel cables 10, each freely extends through a hole made in the sides 2 adjacent bight portion 3. The lower end of each steel cable 10 is inserted within a tubular hook member 11, which is press fitted onto the steel cable. This hook member 11, as shown in FIGS. 3 and 5, is removably inserted within the hole of a lug 12 which is integral with the lower end portion of each tine of rear fork A and which is of conventional shape, these lugs 12 normally designed to receive the rigid support leg of a conventional bicycle rack. The lower end portion 13 of each tire of rear fork A is of conventional shape and serves to be fixed to the rear axle 14 the rear wheel C. The upper end of each cable is inserted within and fixed into the sleeve of a connector ball member 15, which is removably attached by a hook 16 to one end of tension-adjusting means, namely: a turnbuckle assembly, 16-17, the other end of which has a hook 18 for removable attachment to the frame 19 of the bicycle seat 20, the frame 19 being normally exposed underneath the seat 20. Preferably, they are provided with additional spaced connector ball members 15' press fitted along the respective cables 10 at the upper portion thereof. Each cable 10 is further provided with an abutment sleeve 21, which can be adjustably positioned along the cable and then clamped into a position to have a press-fit with the cable. The stop sleeve 21 forms a stop abutting the underside of the side 2 of rack 1, which prevents downward sliding of the rack along the cables 10.

From the foregoing, it is seen that, once the inner end of rack 1 has been attached to the cross-brace D by the hook members 7, as previously described, the lower hook members 11 are simply attached to the lugs 12 of the end connector pieces 13 at the lower end of each fork tine on each side of the bicycle rear wheel C. Then the turnbuckles 17 are attached by their hooks 18 to seat frame 19; then the turnbuckles are tightened to the required tensioning of the cables 10 and, finally, stop sleeves 21 are positioned along the cables 10 to abut the underside of rack 1, with the latter generally in horizontal position, and finally the sleeves 21 are clamped onto the cable.

From the foregoing, it is obvious that the luggage rack can fit bicycles of different makes and sizes, including with rear wheels of various diameters. So much so that, if the cables are found to be too long, then it is a simple matter to have the hook 16 of the turnbuckle 17 engage any of the intermediate connector ball members 15'.

Luggage can be attached on top of rack 1 by suitable strap means, with the portion of the cables 10 extending over the rack serving also to confine the luggage over the rack. Luggage can be also stacked on the rack over the cables 10. When the bicycles rides on a rough road, there is practically no vibrations transmitted to the rack 1 and to the load carried by the same, due to the combination of the pivotal connection formed by hook members 7 and of the flexible ties or steel cables 10. Therefore, no vibration is transmitted from the rack and its load to the cyclist riding on the seat 20.

It should be noted that the rack can be adjusted, so that there is a certain free play between the notch formed by tines 5 and the rear forks A, so that the rack can be allowed to move a slight distance upwardly from its normal horizontal position. The rack 1 and its cables 10 can be easily detached from and mounted on the bicycle in a minimum of time and takes up a minimum of space when stored away. Also, it can be installed on various makes of bicycles without any modifications being carried out to the same.

The width of the rack 1 can be varied within limits with the sides 2 laterally outwardly offset from the inner ends of these sides carrying the tines 5, as shown in the drawings.

Because hook members 7 are upwardly directed and the rear forks A are upwardly forwardly inclined, it will be noted that the cables 10, or guy wires 10, exert an upwardly-sliding movement of the tines 5 along the rear fork and, thus, positively maintain the hook members 7 in engagement with the cross-brace D. The latter normally carries the rear wheel brakes for the bicycles. The hook members 7 are small enough so as to extend on each side of the brake mechanism and not interfere with the same.

The same principles as above described apply also to the front rack 22 which constitutes the second embodiment of the invention and which is shown in FIG. 2 and in FIGS. 8 to 11 inclusive.

Front rack 22 is of generally rectangular shape when seen in plan view, being made of tubular rigid material defining parallel sides 22', an outer cross-member 23, transverse braces 24, and a single centrally-extending tubular leg 25 projecting outwardly from the inner end of the rack 22.

The front fork E of the bicycle is normally fixed by a standard bolt 26 to a mechanism joining the top portion E' of the front fork to the stem F of the bicycle handle bars G, this mechanism being located in the usual front sleeve H of the bicycle frame B, so that the handle bars G can steer front fork E and, consequently, the front wheel 1 of the bicycle.

The above-noted bolt 26 has a head which is normally accessible below the cross-portion E' uniting the top ends of the front fork tines. In accordance with the invention, a support bracket 27 is provided, which is fixed by bolt 26 against the underside of cross-portion E' between the tines of fork E. This bracket 27 is provided with a forwardly-opening blind bore 28 which receives with a loose fit, the free end of single leg 25 of front rack 22. Therefore, the rack can pivot to a limited extent with respect to the front fork E.

As in the previous embodiment, the outer ends of sides 22' are each provided with a through opening 29, through each of which slidably extends a guy wire or flexible cable 10' which is fitted with hook members 11' at its lower end, adapted to be removably attached to eye lugs 12' formed at the lower ends of the bicycle front fork E, or which may be provided at a separate piece if such eye lugs 12' are absent from the bicycle.

As in the previous embodiment, the top end portions of the guy wires or cables 10' are provided with a series of connector ball members 15', anyone of which can be selectively engageable with the hook 16' of a turnbuckle assembly 17', the upper end of which is removably attached to the inside of the handle bars G by means of hooks 18' and collars 30.

As in the first embodiment, a stop sleeve 21' is provided for each cable and is adjustable along the cable to maintain the front rack 22 in substantially horizontal position over the front bicycle wheel I. If necessary, the single leg 25 may be downwardly offset from the plane of the frame constituting the front rack 22, so as to clear the front wheel I. The cable arrangement does not interfere with the normal operation of the brake levers J, and the pivotal attachment of the rack to the front fork does not interfere with the front brakes, not shown, which are normally attached to cross-portion E'. The front rack assembly can be adjusted to different bicycle makes and front wheel diameters as for the rear rack assembly. The front rack assembly can be installed and dismounted in a minimum of time and takes up a minimum of room when stored away. The guy wires 10' together with the pivotal connection formed by bore 28 and leg 25, defines a suspension system for the rack and its load, whereby a minimum of vibrations are transmitted to the front rack and load when the bicycle rides on a rough road and, therefore, vibrations from the load are not transmitted to the cyclist.

What I claim is:

1. A luggage rack adapted for placement spacedly over the wheel of a cycle, such as a bicycle and the like, comprising: an elongated frame forming a supporting means for luggage and adapted to be longitudinally placed spacedly over the top of a wheel of the cycle, said frame having an inner end portion and an outer end portion; securing means for securing the inner end of said frame to the frame of the cycle while allowing limited pivotal movement of said elongated frame in the plane of the cycle wheel; flexible ties extending from the outer end portion of said elongated frame above and below the latter and adapted for connection at a position adjacent the axle of the wheel of the cycle at one end and adapted for connection at the other end at a position on said cycle above said securing means said ties including a pair of guy wires slidably extending through transversely-spaced portions at the outer end of said elongated frame and stop members fixedly carried by said respective guy wires and abuttable with the underside of said elongated frame, to prevent downward sliding of the latter along said guy wires; wherein said flexible ties position said elongated frame relative to said wheel, concurrently with constituting together with said securing means a suspension means, whereby said elongated frame, and thus said luggage supported thereon will not be subjected to the full effect of shocks sustained by said wheel on a road.

2. A luggage rack as defined in claim 1, further including adjustable tensioning means for adjusting the tension of said ties.

3. A luggage rack as defined in claim 2, wherein said stop members are adjustably positioned along said guy wires.

4. A luggage rack as defined in claim 3, wherein said tensioning means consists of turnbuckles removably attached at one end to each of said guy wires at selectable points along said guy wires and removably attachable at their other ends to a part of said cycle.

5. A luggage rack as defined in claim 4, wherein the opposite ends of said guy wires have hook members removably attachable to the cycle.

6. A luggage rack as defined in claim 3, wherein the frame of said cycle defines a rear fork assembly for straddling the rear wheel of said cycle, the tines of said fork assembly being interconnected at their upper end by a brace member, said elongated frame adapted to overlie the rear wheel of said cycle, said securing means including hook members carried by the inner end of said elongated frame and removably engageable with said brace member.

7. A luggage rack as defined in claim 6, wherein the inner end of said elongated frame is provided with pairs of tines defining each a notch for receiving the respective tines of said fork assembly, said hook members downwardly depending from each pair of tines.

8. A luggage rack as defined in claim 3, wherein said elongated frame is adapted for placement over the front wheel of a cycle and includes a single leg extending outwardly and centrally from its inner end, a connector member adapted to be fixed to the underside of the cross-member of the front fork of the cycle, said connector member having a forwardly-opening blind bore, said leg removably insertable within said blind bore, the latter having a larger cross-sectional size than the cross-sectional size of said leg for limited pivotal movement of said elongated frame in the plane of said front wheel; and means to removably attach said respective guy wires to the respective handle bars of said cycle.

* * * * *